US007471189B2

(12) United States Patent
Vastad et al.

(10) Patent No.: US 7,471,189 B2
(45) Date of Patent: Dec. 30, 2008

(54) VEHICLE ID

(75) Inventors: Fredrik Vastad, Täby (SE); Joakim Hällberg, Åkersberga (SE)

(73) Assignee: Facility Parking Europe AB, Taby (SE)

( * ) Notice: Subject to any disclaimer, the term of this patent is extended or adjusted under 35 U.S.C. 154(b) by 143 days.

(21) Appl. No.: 10/543,700

(22) PCT Filed: Jan. 29, 2004

(86) PCT No.: PCT/SE2004/000115

§ 371 (c)(1),
(2), (4) Date: Apr. 26, 2006

(87) PCT Pub. No.: WO2004/068417

PCT Pub. Date: Aug. 12, 2004

(65) Prior Publication Data

US 2006/0232442 A1 Oct. 19, 2006

(30) Foreign Application Priority Data

Jan. 30, 2003 (SE) .................................... 0300221

(51) Int. Cl.
*H04N 7/18* (2006.01)
*H04N 9/47* (2006.01)
*B60R 25/10* (2006.01)
*G06K 9/00* (2006.01)

(52) U.S. Cl. .................... 340/426.1; 382/104; 348/148; 348/149

(58) Field of Classification Search ................. 382/104, 382/105; 340/426.1, 430, 932.2, 937; 342/52-54, 342/61, 66; 235/384; 348/28 R, 33, 148, 348/149; 404/6-8
See application file for complete search history.

(56) References Cited

U.S. PATENT DOCUMENTS

| | | | | |
|---|---|---|---|---|
| 4,507,654 | A * | 3/1985 | Stolarczyk et al. | 340/545.3 |
| 4,603,390 | A | 7/1986 | Mehdipour et al. | 364/467 |
| 4,878,248 | A * | 10/1989 | Shyu et al. | 382/105 |
| 4,963,723 | A * | 10/1990 | Masada | 235/384 |
| 5,568,406 | A * | 10/1996 | Gerber | 702/159 |
| 5,734,343 | A * | 3/1998 | Urbish et al. | 340/942 |
| 5,745,052 | A | 4/1998 | Matsuyama et al. | 340/932.2 |

(Continued)

FOREIGN PATENT DOCUMENTS

JP 9296621 11/1997

*Primary Examiner*—George A Bugg
*Assistant Examiner*—Jennifer Mehmood
(74) *Attorney, Agent, or Firm*—Harness, Dickey & Pierce, P.L.C.

(57) ABSTRACT

The invention is provided by means of a method for identifying a vehicle, comprising recording at least a first image of the vehicle using a digital camera, which first image includes at least a registration plate and a light arrangement. The method comprises the steps of identifying the position on the car and the orientation of the light arrangement from the first image, and of determining the type of vehicle on the basis of information stored in a database relating to the position and orientation of light arrangements on different types of car and the identification of the position and orientation of the light arrangement, and of identifying the position on the car and the orientation of the registration plate in relation to the identified position of the light arrangement from the first image in order thereby to obtain a unique identification of the vehicle.

24 Claims, 3 Drawing Sheets

U.S. PATENT DOCUMENTS 5,809,161 A * 9/1998 Auty et al. .................. 382/104
5,839,085 A * 11/1998 Yoshikawa et al. .......... 701/117
6,255,946 B1 * 7/2001 Kim ........................... 340/556
6,281,928 B1 * 8/2001 Umezaki et al. ............ 348/148
6,411,215 B1 * 6/2002 Shnier ..................... 340/686.1
6,650,765 B1 * 11/2003 Alves ......................... 382/105
6,754,369 B1 * 6/2004 Sazawa ...................... 382/105
6,832,728 B2 * 12/2004 Kennedy .................... 235/468

* cited by examiner

VEHICLE ID

CROSSREFERENCE TO RELATED APPLICATIONS

This application claims the benefit of PCT/SE04/00115, filed on Jan. 29, 2004.

TECHNICAL FIELD

The present invention relates to the identification of vehicles. In particular, the present invention relates to the identification of vehicles when entering and exiting a monitored area, for example a car park or at national boundaries.

In particular, the invention relates to a method that prevents the theft of vehicles from a car park, and an arrangement for carrying out the method.

BACKGROUND ART

Road tolls are increasingly common and, for such road tolls, it is important to be able to identify vehicles without the traffic flow being interrupted too much, in order to be able to charge for the vehicle. Also for automatic traffic monitoring, at barriers to protected areas or more generally for monitored areas, it is important to be able to identify a vehicle. Traditionally, for such identification the registration number is read automatically by image processing. However, such image processing requires a high-quality image in order that an incorrect registration number should not be read off, which complicates such a method. For example, dirt and snow can prevent the correct reading of the registration number.

There is thus a great need for improved identification of vehicles.

When parking vehicles in large public car parks, such as at airports, etc., it is a common problem that the vehicle is stolen while the owner is away.

In many cases it is a long time before the theft is discovered. This can, for example, be the case when a person parks his car in an airport car park before a long stay abroad. In this case, the car is usually not notified as missing until the theft is discovered, that is when the owner returns and finds that the car has been stolen.

There is thus a great need to reduce the risk of the theft of vehicles from public car parks.

Entering and exiting car parks can, for example, be carried out in such a way that the driver obtains a car park ticket at an entrance barrier upon which the time is recorded. Before the vehicle is retrieved, payment for the parking must be made, which is checked by means of the car park ticket at an exit barrier, after which the car is allowed to leave. A disadvantage of this system is that no check is made that it is the same car at the exit as at the entrance. The driver may, for example, have parked an old car in poor condition and obtained a car park ticket, in order later to steal a valuable car and drive it out of the car park using his car park ticket.

Another problem is the theft of vehicles by tailgating, that is a stolen vehicle is driven out closely behind another vehicle that is allowed out through the exit barrier.

In U.S. Pat. No. 5,034,739, this problem is solved by a camera placed at the entrance barrier taking a picture of the vehicle's registration plate and storing the image in a computer. At the exit, a second camera then takes a new picture of the vehicle's registration plate, after which the computer compares the two pictures and checks whether a payment has been made for the parking for this vehicle, after which it is allowed to leave.

U.S. Pat. No. 4,775,571 describes a similar solution, but where in addition a picture of the registration plate is transferred onto a car park ticket both at the entrance and at the exit, with both these tickets having to be handed in at the exit barrier together with the payment in order for the car to be allowed to leave.

A disadvantage of these two previously known systems is that the theft of a vehicle can still be carried out by transferring the registration plate to another more valuable car.

GB 2 273 596 describes a vehicle protection system in which data that identifies both the vehicle and the driver are stored together when entering the car park. When exiting, the identities of both the driver and the vehicle are then checked and compared with the stored information. The vehicle identification is carried out by means of a video camera, among other things for obtaining the registration number. It is mentioned, however, that other characteristics of the vehicle can also be determined, such as the orientation of the screws that hold the registration plate and nuances in the vehicle's color.

BE 1010751 also describes a theft prevention system for a car park, where an image is recorded of the vehicle when entering and the image is analyzed, after which the result of the analysis is transferred onto a car park ticket. When exiting, another image of the vehicle is recorded which is analyzed, after which the result of the analysis is compared with the data on the car park ticket. If the data is the same, the vehicle is allowed to leave.

Both these theft prevention systems make the theft of vehicles by changing the registration plate more difficult. However, they have disadvantages, for example problems can arise if the appearance of the vehicle is not the same when entering and exiting, which can be the case in the event of snow falling. In addition, differences in the general lighting at the entrance and exit can make the identification more difficult. It is a considerable disadvantage if the owner of a vehicle is not able to retrieve his own car from a car park because night has fallen while it has been parked, so that the light is different when the car leaves the car park than it was when the car entered the car park.

DISCLOSURE OF INVENTION

The main aim of the present invention is thus to provide an apparatus and a method for making it possible to identify a vehicle.

A particular aim of the present invention is to provide an apparatus and a method for identifying a vehicle on the basis of the position of the number plate.

An additional particular aim of the present invention is to identify the type of vehicle by recognizing the position and orientation of rear lights, brake lights and/or reflectors on the vehicle.

Yet another particular aim of the present invention is to reduce the risk of theft of vehicles from public car parks, while at the same time avoiding the disadvantages mentioned above.

The abovementioned aims are achieved with an apparatus and a method in accordance with the attached independent claims.

Advantageous alternatives and embodiments of the present invention are achieved by means of apparatus and methods in accordance with the attached dependent claims.

The abovementioned aims are achieved by means of a method for identification of a vehicle, comprising recording with a digital camera at least a first image of the said vehicle which includes at least a registration plate and a light arrangement.

The method comprises the steps of identifying the position on the car and the orientation of the light arrangement from the first image, of determining the type of vehicle on the basis of information stored in a database relating to the position and orientation of light arrangements on different types of cars and the identification of the position and orientation of the light arrangement, and of identifying the position on the car and the orientation of the registration plate in relation to the identified position of the light arrangement from the first image in order in this way to obtain a unique identification of the said vehicle.

By identifying the position and orientation of the light arrangements, a coordinate system on the car is obtained in which the position and orientation of the registration plate can be determined. As the fitting of the registration plate is carried out manually, the position of the registration plate will be unique to each car and by determining the position and orientation of the registration plate, a set of values are obtained that uniquely identifies the car.

The light arrangement can be a rear light arrangement, including reflectors, rear lights and brake lights or a front light arrangement.

By comparing the position and orientation of the rear light arrangements with data stored in a database, the type of vehicle can be identified. For example, a Volvo V70 does not have the rear light arrangement positioned in the same way as a SAAB 93. For this identification, the position of the registration plate on the car can also be used.

It should be noted that, for the determination of the type of vehicle, the determination of the position and orientation of the rear light arrangements can be carried out relatively roughly. When the identification of the type of vehicle has been obtained, however, a very precise coordinate system can be set up, by utilizing information from the database, which is used in order to determine the position and orientation of the registration plate in a very precise way. It is possible to achieve an accuracy of a couple of millimeters.

According to a preferred embodiment, for the recording of the image, the vehicle is illuminated with infrared light, for example by a flash unit or with constant illumination, or with light in the visible spectrum, for example by a flash unit or with constant illumination. Alternatively, laser illumination can also be used.

By lighting the vehicle, a more advantageous image can be obtained, which is easier to analyze.

Alternatively, several images can be recorded, for example three, with different camera settings, such as for example different apertures. Each of these images can then be analyzed and the image that provides the best result can then be used in the further identification of the vehicle.

According to a preferred embodiment of the invention, the determination of the position and orientation of the rear light arrangements/registration plate is carried out by matching a geometric figure that comprises a first and a second axis and a center of gravity, for example an oval or a rectangle, to light fields in the said first image, and of calculating a first set of values on the basis of the size of the said first and second axes, their angle in relation to the perpendicular of the image, and the relation of the centers of gravity of a number of the different light fields to each other. These values determine the position and orientation.

If, for example, an oval is used, a Volvo V70 will have a certain set of values for the longer axis, shorter axis, their angle in relation to a perpendicular, and center of gravity for the light fields that are identified as the rear light arrangements/registration plate, which set of values distinguishes it from other types of car.

The precise distance from the camera to the vehicle can be determined by using stereo camera technology. This can be carried out by means of two cameras or by taking a first image, moving the camera a known distance and taking another image. According to a variant of the invention, the system comprises an ultrasound arrangement which is placed at a known distance from the camera. The ultrasound arrangement sends out ultrasound towards the vehicle and detects reflections and by this means the distance from the camera to the vehicle can be determined. When the distance to the vehicle is known, the actual size of the light arrangements and the registration plate can be determined. This can be of great use in the further analysis, in order for example to determine the type of vehicle.

The type of vehicle is identified by searching in the database for values that are the same as the said first set of values and by associating the said vehicle with the type of vehicle which is associated in the database with the said first set of values.

Values for a Volvo V70, for example, are stored in the database and, after a normalization, it is checked whether the calculated values are the same as the values stored in the database. If this is the case, the vehicle is a Volvo V70.

According to yet another preferred embodiment, the database comprises a set of different values for each type of vehicle. If, for example, a driver is braking when the image is recorded and the vehicle is illuminated, the rear lights, brake lights and reflectors will all create light areas in the digital image. If, however, the driver is not braking, the brake lights will not appear as light areas in the image. This means that the two different alternatives give different values and in order to be able to match the different alternatives to the correct type of car, the database contains both alternatives. Other alternatives can comprise various fault situations, where for example a lamp or reflector is not working.

In a special embodiment, the identification is used when parking a vehicle.

In this method according to the invention, one or more images are recorded of the vehicle's rear registration plate and its rear lights at the entrance to the car park in accordance with the above. In connection with recording the images, the registration plate and the rear lights can be illuminated, for example with infrared light, and thereafter an analysis of the vehicle is carried out using the images in accordance with the above.

The analysis can also include determining the vehicle's registration number.

Thereafter the results of the analysis are stored, together with a link to the vehicle's driver, in a server or the like, for example a database. When the vehicle leaves, the same image recording and analyzes are carried out as when entering, after which these analysis results are compared with the analysis results for entering that are stored for the vehicle's driver. In the event of the analysis results being the same, this shows that a driver wants to retrieve the same vehicle that he drove in, whereupon the vehicle can be allowed to leave, provided that payment for the parking has been made.

As the precise positions of the registration plate and the rear lights are determined in relation to each other and in relation to the body of the vehicle, their height above the ground, etc, measurement values are obtained that are characteristic for each individual vehicle. This is because the plate and the rear lights are placed differently on different models of car, and also because registration plates are fitted manually, for which reason their position is not identical on different vehicles of the same model. These measurement values are not affected by snow or ice. As the vehicle's registration number is also determined, by comprising the results of the analyzes from the entrance and exit checks, it is possible to determine with great accuracy that the driver is driving out the same vehicle that he drove in, and that the registration plate has not been moved to another vehicle.

Another advantage of carrying out measurements for the registration plate and rear lights is that these are normally provided with reflectors, so that light is reflected back from these instead of being dispersed, whereby less light is needed to obtain good images.

If the vehicle is not to be allowed to leave, either because the driver has attempted to drive out a different vehicle to the one he drove in, or because payment has not been made, it is important to be able to prevent it from leaving effectively. This can be carried out by the vehicle being driven forward to a first lowered barrier prior to the exit check, and then a second barrier is lowered behind the vehicle. While the vehicle is thus in a "lock" between a front and a rear barrier, the image recording, analysis and exit check are carried out. If the car is to be allowed to leave, only the front barrier is raised, whereby "tailgating" by a second vehicle is prevented.

The vehicle can also be parked in a similar lock at the entrance control as at the exit control. As the images are recorded while the vehicle is in a lock, at a known distance from the camera, a precise position determination of registration plates and rear lights is made easier.

The analysis results for an entering vehicle are stored in a server, together with a link to the vehicle's driver. This link can be a code that is created when storing the analysis results and that is printed out on a car park ticket for the driver. The driver can later use the car park ticket when paying for the parking and at the exit control. The ticket can also be provided with a picture of the vehicle.

Additional images of the vehicle can be recorded without simultaneous infrared lighting, and the analysis method can comprise these images being subtracted from the images recorded with infrared lighting. By this means, images are obtained that are independent of the general lighting in the car park. By means of this, the problem is solved of the lighting and illumination conditions being different at the entrance and exit controls.

Position determination of the vehicle's tax mark and determination of the car model can also be included in the analysis.

The arrangement according to the invention for carrying out the method consists of an entrance lock and an exit lock, each provided with a digital camera, a control device such as preferably a PC connected to a server, and an infrared illumination unit mounted in association with the camera.

At least the exit lock can be designed with a front and a rear parking barrier, both of which are lowered while the checks are being carried out, after which only the front barrier is raised when the vehicle can be permitted to leave. This lock arrangement prevents tailgating, that is a second vehicle being driven out straight after a first vehicle.

If both the entrance and exit locks are designed in the same way with a front and a rear barrier, the advantage is achieved that the position of the vehicle between the barriers means that its distance to the camera is known, which makes the analyzes easier.

Further characteristics of the invention and its advantages will become apparent from the following detailed description of embodiments according to the invention.

BRIEF DESCRIPTION OF DRAWINGS

The present invention will be easier to understand from the detailed description of preferred embodiments according to the present invention given below and the attached FIGS. 1 to 3, which are only intended to illustrate the preferred embodiments and do not restrict the present invention.

The invention will be described in greater detail below with reference to FIGS. 1-3, in which.

PREFERRED EMBODIMENTS

In the following, specific techniques and applications are described with the aim of providing a basic understanding of the present invention. However, it will be obvious to experts in the field that the present invention can be implemented in other embodiments that differ from what has been described here in detail. In other cases, detailed descriptions of well-known methods and apparatus have been omitted in order not to obscure the description of the present invention with unnecessary details.

Figure 4A:
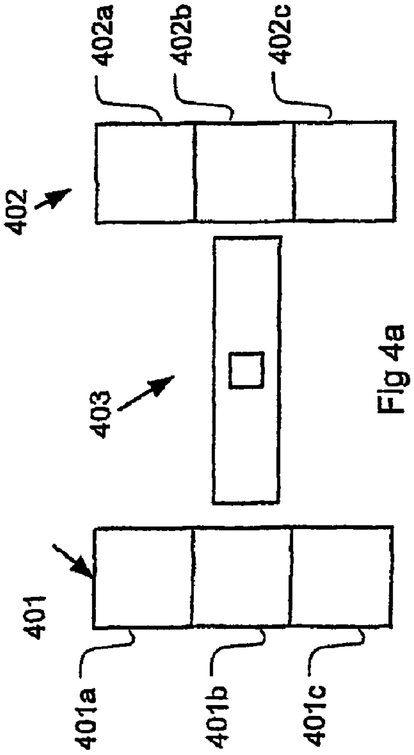
FIG. 4*a* shows schematically a vehicle rear light arrangement according to example embodiments.

FIG. 4*a* shows a first rear light arrangement 401, a second rear light arrangement 402 and a registration plate 403 on a car, represented schematically. The first rear light arrangement 401 comprises brake light 401*a*, rear light 401*b* and reflector 401*c* and similarly the second rear light arrangement comprises brake light 402*a*, rear light 402*b* and reflector 402*c*. On the registration plate, there is also a tax mark.

Figure 4B:
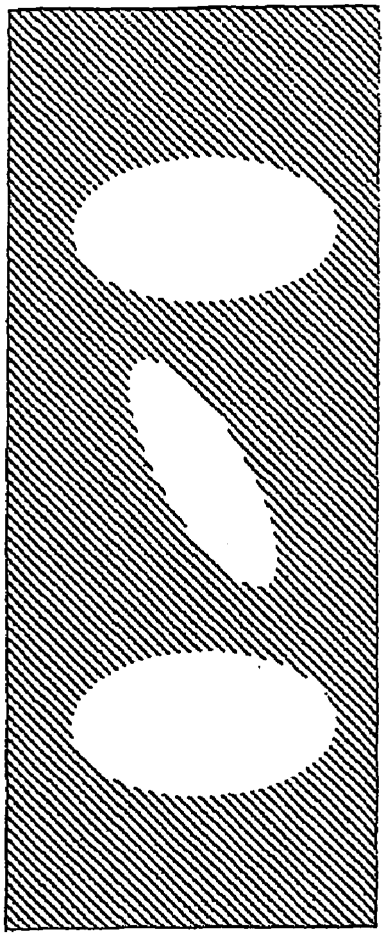
FIG. 4*b* shows schematically a digital image of a back of a vehicle, recorded with illumination, according to example embodiments.

FIG. 4*b* shows schematically a digital image of the back of the car in FIG. 4*a* recorded with illumination. In the image, lighter areas are created around the rear light arrangements 401 and 402, in 35 addition to the registration plate 403 which is reflective. When the image in FIG. 4*b* was recorded, the driver was braking, for which reason the light areas comprise the whole of the rear light arrangements 401 and 402.

Figure 4C:
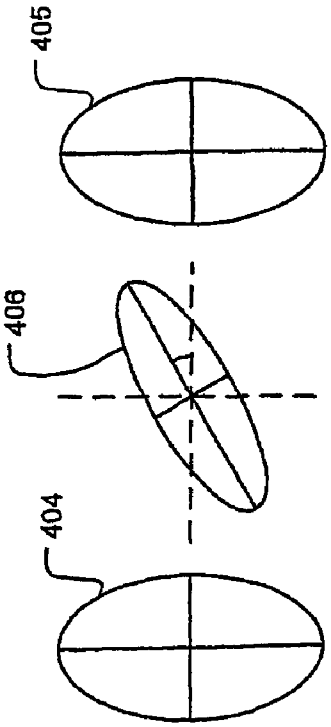
FIG. 4*c* shows schematically where ovals have been matched to lighter fields during image processing according to example embodiments.

FIG. 4*c* shows schematically where ovals have been matched to the lighter fields in FIG. 4*b* during the image processing. Three ovals have been identified. A first oval 404 represents the first rear light arrangement 401, a second oval 405 represents the second rear light arrangement and a third oval 406 represents the registration plate 403. The ovals 404, 405 and 406 have each a longer axis and a shorter axis and a center of gravity (where the longer and shorter axes intersect). On the basis of the values of the axes and the position of the centers of gravity in relation to each other, and if required also how the axes are rotated in relation to each other, that is how the rear lights and the registration plate are oriented on the car, the type of car can be uniquely identified. It should be noted that additional ovals or other geometric figures can be matched to each lighter field in order, in this way, also to identify the shape of the field. If, for example, the field is an L-shape, a first oval can be matched to the vertical part of the field and a second shape to the horizontal part of the field. By comparing the positions and sizes of the axes of the matched ovals, it can be concluded that the light field is an L-shape, which can be characteristic of a certain type of car.

Other identification values can also be used, for example the length of the car can be measured by ultrasound, the height above the ground of the rear light arrangements can be measured, the color of the car can be identified, etc.

When the type of vehicle has been identified, the displacement of the registration plate from the normal value in relation to the position of the rear light arrangements and its rotation can be calculated. These values, the position (two values) and the rotation (one value) identify the car uniquely.

Figure 4D:
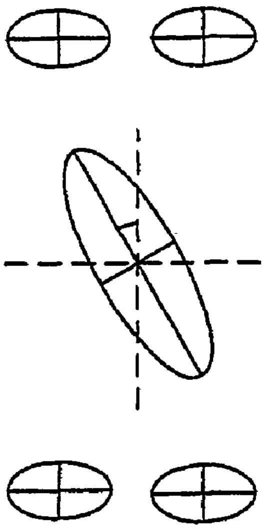
FIG. 4*d* shows schematically a case where both rear lights are not working, according to example embodiments.

FIG. 4*d* illustrates a case where both rear lights 401*b* and 402*b* are not working. This will result in two ovals being created for each rear light arrangement 401 and 402. In order for the computer to be able to identify the type of car, this case must also be recorded in the database. The database will in fact consist of a whole set of different cases for each model of car, where different combinations of possibilities are listed. For example, the fact that the left rear light is not working, that the right reflector is covered by snow, that the driver is braking or not braking, etc. These cases can be recorded by recording images of a known vehicle and letting the computer analyze the image and thereafter specifying which model of car the analysis represents or by carrying out simulations in the computer.

It should be noted that the method described above can also be used from in front of a vehicle, with the position, shape and orientation of the front lights and the registration plate on the front of the car being identified.

Figure 1:
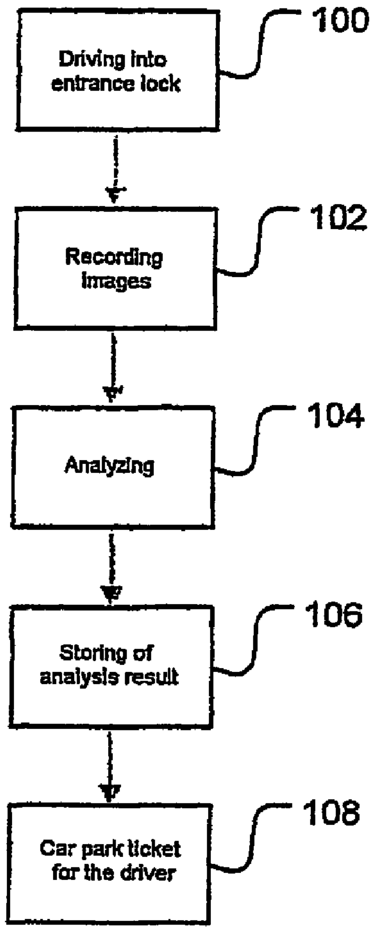
FIG. 1 is a flow chart that shows the steps of the method during entering.

FIG. 1 shows a flow chart of the steps that are carried out at the entrance control according to a preferred embodiment of the method according to the invention in order to check vehicles in car parks. In step 100, the vehicle is driven into the entrance lock, so that it is located between a front and a rear barrier. In step 102, an image is recorded of the vehicle using a digital camera, such as for example a CCD (charge-coupled device) camera. The camera is mounted in such a way that it can record images of the vehicle's rear registration plate and rear lights. In addition, an infrared illumination unit provided with infrared light-emitting diodes is mounted in the vicinity of the camera to illuminate the registration plate and the rear lights. Images can be recorded both with and without infrared illumination, in order to obtain measurement results that are independent of the general lighting. In step 104, an analysis is carried out by a control unit, preferably a PC, connected to the camera. In addition, the PC is connected to a server or the like for storing the results of the analysis, and the PC or the server is provided with analysis software. This software comprises programs for position determination of the registration plate by means of the images, and a system that extracts the registration number from a camera image. The analysis can also comprise determination of the model of car and of the position of the tax mark. In step 106, the results of the analysis are stored in the server, whereby a code is created that gives access to the results of the analysis. In step 108, the driver of the vehicle receives a car park ticket, provided with the code, from a ticket printing machine. The ticket printing machine is located beside the lock and is connected to the control unit. If required, the car park ticket can also be provided with a picture of the vehicle.

Figure 2:
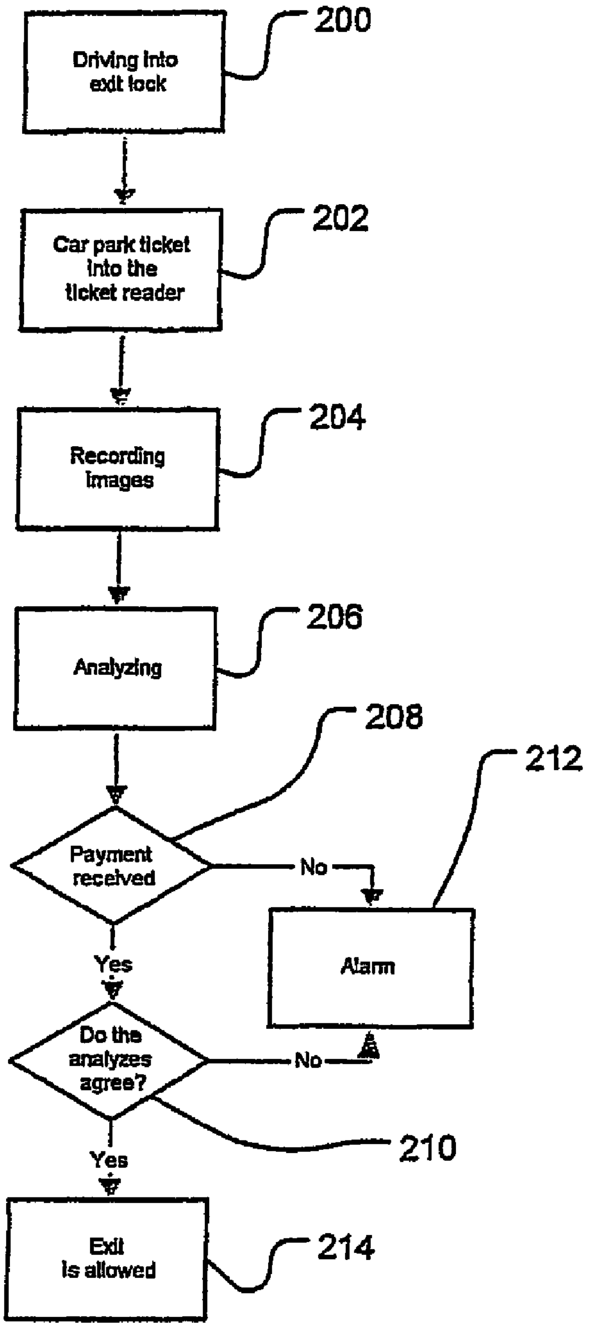
FIG. 2 is a flow chart that shows the steps of the method during exiting.

FIG. 2 illustrates the steps that are carried out when the vehicle leaves, according to the preferred embodiment of the invention. In step 200, the driver has retrieved his vehicle and driven into the exit lock. This is designed in a similar way to the entrance lock, with a digital camera, an infrared illumination unit and a PC connected to a server. However, it is provided with a ticket reader instead of a ticket printer, for reading the driver's car park ticket, according to step 202. In step 204, an image is recorded with infrared illumination, as in step 102 at the entrance, while the vehicle is located between a front and a rear barrier. In step 206, the same analyzes are carried out as at the entrance, that is primarily a precise position determination of the vehicle's registration plate and rear lights, using the infrared illumination that is reflected from the plate and the rear lights, and determination of the vehicle's registration number. In step 208, it is checked that payment has been received for the parking, and if this is the case, in a step 210, a comparison is then carried out between the results of the analyzes from step 206 and the driver's stored analysis results from step 104 at the entrance, which the PC can read off by means of the code on the car park ticket. In step 214, the car is allowed to leave by the front barrier being raised, if the comparison in step 210 showed that the vehicle that the driver intends to drive out is the same vehicle as the one that he drove in. As a result of only the front barrier being raised, so-called tailgating is prevented, that is an additional vehicle being driven out straight after the first. In the alternative step 212, the vehicle is instead to be prevented from leaving, and the barriers are not raised, but instead a park attendant is notified. The attendant can then carry out a manual check of the driver's identity and the identity of the vehicle, and can allow the vehicle to leave or can call the police.

In a second embodiment of the invention, no car park ticket is printed out. Instead an account card belonging to the driver is used, with information on this being able to be linked to the stored analysis results for the parked vehicle.

Figures 3A, 3B:
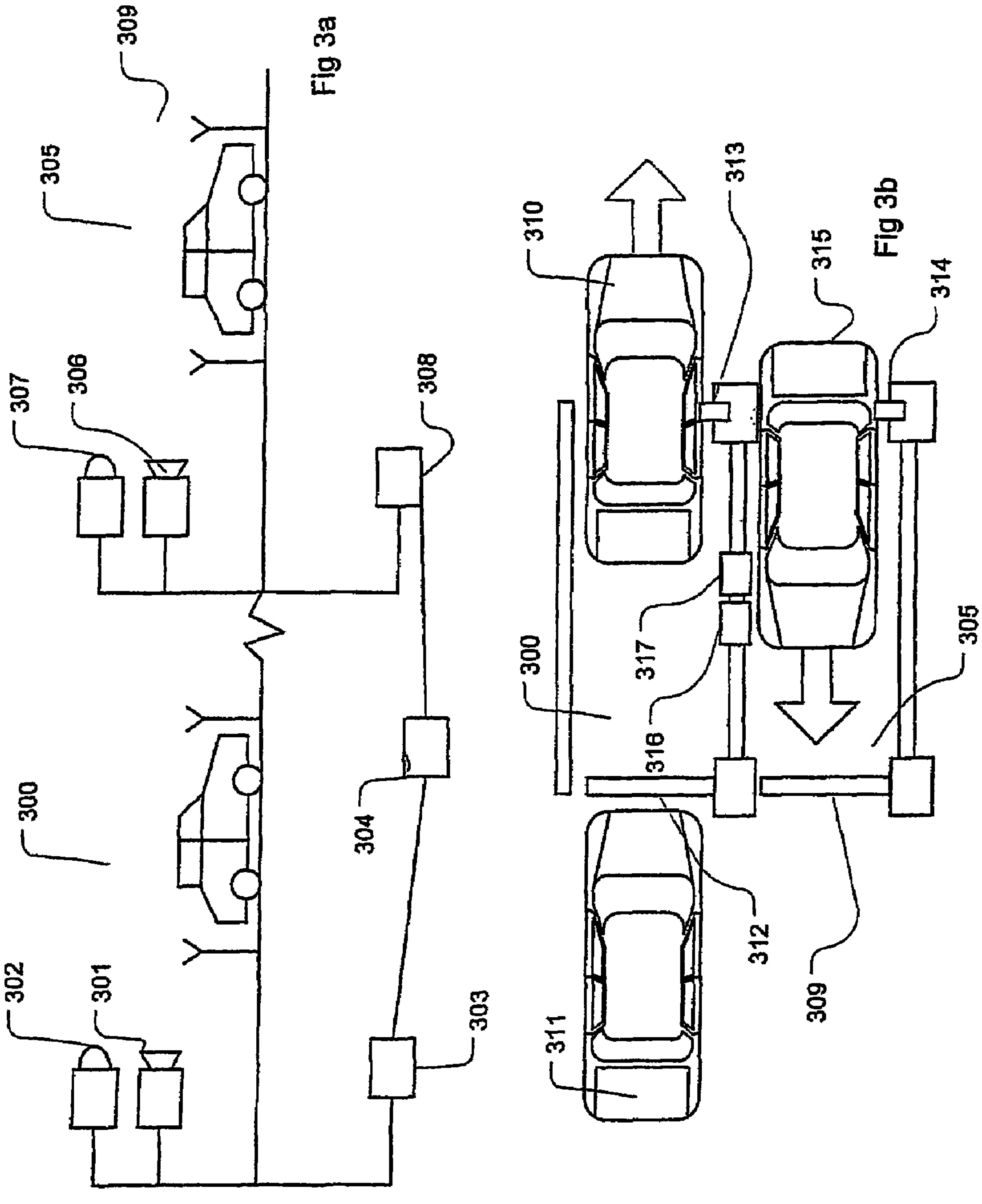
FIG. 3*a* shows schematically a traffic control system in a view from the side according to an embodiment of the invention.
FIG. 3*b* shows schematically a vehicle lock in a view from above according to an embodiment of the invention comprising an entrance control and an exit control.

FIG. 3*a* illustrates the arrangement according to the invention for checking vehicles in a car park. A vehicle that is to be parked is driven into the entrance lock 300. There images are recorded of the vehicle's registration plate and rear lights using a digital camera 301. The car can be illuminated by an infrared illumination unit 302, mounted close to the digital camera, whereby images can be recorded with the infrared illumination switched on. Analyzes of the images are then carried out by a computer 303, after which the results are stored in a server 304, together with a link to the driver of the vehicle, by the driver obtaining a car park ticket that gives access to the results of the analyzes, or by information from an account card that belongs to the driver being stored together with the results of the analyzes.

A vehicle that is to be retrieved from the car park is driven into the exit lock 305 where images are recorded of the vehicle by means of a digital camera 306, while at the same time, if required, the vehicle is illuminated by an infrared illumination unit 307. Analyzes are carried out in a computer 308, after which the results of the analyzes are compared with the results which were obtained when the vehicle entered the car park and which are stored in the server. If the comparison shows that the driver intends to drive out the same vehicle that he drove in, the front barrier 309 is raised, so that the vehicle is allowed to leave.

FIG. 3*b* shows schematically a vehicle lock in a view from above according to an embodiment of the invention comprising an entrance control 300 and an exit control 305. The entrance and exit controls work in the same way. A first vehicle 310 is on its way out from the entrance control and a second vehicle 311 is waiting to be able to enter the entrance control 300. An entry barrier 312 prevents the first vehicle 311 from coming into the entrance control 300 while the first vehicle 310 is driving out. The first vehicle is allowed to drive out by the removal of an exit barrier 313. In the present embodiment, the entry and exit barriers consist of barriers that are raised and lowered. At the same time, a third vehicle 315 is on its way into the exit control 305. It is allowed to enter by an entry barrier 314 having been removed, in this case a barrier has been raised. As can be seen easily in FIG. 3*b*, the third vehicle 315 cannot drive straight through the exit control in order to sneak through, as an exit barrier 309 prevents exit from the exit control 305. In addition, first and second ticket machines 316 and 317, comprising for example thermal printers, are arranged to issue or receive tickets, or other forms of identification, for example credit cards, in order to identify the vehicle. In addition, cameras (not shown) are arranged to photograph the vehicle and at least one computer and database are arranged to carry out an analysis and to store results, in order in this way to be able to carry out the identification as discussed above and below.

With reference to FIGS. 1 and 2, the method for checking vehicles according to the invention thus comprises steps of identifying a vehicle by recording images 102, 204 and by analysis 104, 206 of images at an entrance control and at an exit control. The images and/or the analysis results from the entrance control are stored 106 and a comparison 210 is carried out of the analysis results from the exit control with the stored analysis results from the entrance control. On the basis of the result of the comparison, the vehicle is prevented 212 or allowed 214 to leave. The vehicle is admitted to the exit control by the vehicle being driven forwards 200 to a front exit barrier at the exit control. A rear exit barrier is then set up behind the vehicle, so that additional vehicles are prevented from entering the exit control and so that the vehicle cannot reverse out. If the comparison above is positive, that is if the vehicle is to be allowed to leave the control, the front exit barrier is removed, whereby other vehicles are prevented by the rear exit barrier from driving through the exit control at the same time as the vehicle.

According to the embodiment in FIG. 3, the entrance control also comprises a front and a rear exit barrier. At the entrance control, the vehicle is driven forwards to the front exit barrier and the rear exit barrier is set up behind the vehicle. The front exit barrier is then removed when the vehicle is to be allowed to pass through, whereby other vehicles are prevented from driving through the entrance control at the same time as the vehicle. Alternatively, the entrance control can only comprise a front barrier.

According to the embodiment in FIG. 3, the front exit barrier is set up again after the vehicle has passed and the rear exit barrier is not removed until after the front exit barrier has been set up again, so that further vehicles can drive into the said passage control.

According to an alternative embodiment, the front and rear exit barriers can be barriers that are lowered and raised or raised and lowered automatically in order to prevent or allow the passage of vehicles.

In the embodiment in FIG. 3, the analysis comprises identifying the position and orientation on the car of at least one light arrangement and of determining what type of car is in the passage control on the basis of information stored in a database relating to the position and orientation of light arrangements on different types of cars and the said identification of the position and orientation of the said light arrangement. Comparing an analysis result in order just to be able to identify the type of vehicle on the basis of a database of vehicles requires only a relatively rough analysis of the image. The analysis also comprises identifying the position on the car and the orientation of the registration plate in relation to the identified position of the light arrangement by image analysis of the image in order thereby to obtain a unique identification of the said vehicle. By first identifying the type of car and then analyzing the position and orientation of the registration plate with knowledge of the type of car that the registration plate is attached to, an excellent and precise result is obtained. By this means, the car can be uniquely identified.

By information about both the vehicle's registration number and the precise position of the registration plate being determined and recorded at the entrance control, and then the same information being determined at the exit control, the theft of a valuable vehicle by changing the registration plates is prevented from being carried out.

It is obvious that the present invention can be varied in many different ways. Such variations are not to be regarded as a deviation from the scope of the present invention. All such modifications that are apparent to experts in the field are intended to be included within the scope of the attached claims.

The invention claimed is:

1. A method for checking vehicles in a car park, comprising:

identifying a vehicle by recording images and analysis of the vehicle at an entrance control and at an exit control, storing the analysis results from the entrance control, comparing the analysis results from the exit control with the stored analysis results from the entrance control, and preventing or allowing the vehicle to leave, wherein at the exit control, the vehicle is driven forward to a front exit barrier, and a rear exit barrier is set up behind the vehicle, the analysis results includes:

identifying, in at least one of the images taken at the entrance control and at least one of the images taken at the exit control, a position of at least one reflector device on the vehicle, identifying a position and orientation of at least one light arrangement on the vehicle via the analysis of the image recording, determining a type of vehicle on a basis of information stored in a database relating to the position and orientation of at least one light arrangement on different types of vehicles and the identification of the position and orientation of the light arrangement, and identifying a position and orientation of a registration plate of the vehicle in relation to the identified position of the at least one light arrangement via the image analysis of the image in order to thereby obtain a unique identification of the vehicle, the comparing includes comparing the position of the at least one reflector device from the exit control with the stored analysis results from the entrance control, and removing the front exit barrier only when the vehicle is to be allowed to leave, so that other vehicles are prevented from driving through the exit control at the same time as the vehicle.

2. A method as claimed in claim 1, wherein the entrance control includes a front and a rear exit barrier, at the entrance control, the vehicle is driven forward to the front exit barrier, the rear exit barrier is set up behind the vehicle, and removing the front exit barrier only when the vehicle is to be allowed to pass through, so that other vehicles are prevented from driving through the entrance control at the same time as the vehicle.

3. A method as claimed in claim 1, wherein the front exit barrier is set up again after the vehicle has passed through, and the rear exit barrier is removed after the front exit barrier is set up again to allow another vehicle to drive into the entrance/exit control.

4. A method as claimed in claim 1, wherein the front and rear exit barriers are barriers that are lowered and raised or raised and lowered automatically in order to prevent or allow the passage of vehicles.

5. A method as claimed in claim 1, wherein a receipt generated at the entrance control constitutes a code that is created during the storage of the analysis results and printed out onto a car park ticket for the driver of the vehicle, to be used by the driver when paying for the parking and at the exit control.

6. A method as claimed in claim 5, wherein the receipt includes a recording of a code, obtained from a bank card or credit card provided by the driver of the vehicle, together with the analysis results from the entrance control.

7. A vehicle lock in a car park arranged to allow vehicles to pass through in a secure way from a first area to a second area, comprising:

an entry barrier is arranged to prevent entry to the vehicle lock in a first position and to allow entry to the vehicle lock in a second position, the entry barrier being arranged to prevent entry into the vehicle lock when the exit barrier allows exit from the vehicle lock, an exit barrier is arranged to prevent exit from the vehicle lock in a first position and to allow exit from the vehicle lock in a second position, the exit barrier being arranged to prevent exit from the vehicle lock when the entry barrier allows entry into the vehicle lock, and an identification device is provided to identify at least one reflector device on a vehicle, wherein the position and orientation of the reflector device in relation to an identification position of a light arrangement of the vehicle is used to determine if the vehicle is allowed to pass through the vehicle lock.

8. A traffic control system for controlling entry of vehicles from an outer area to an inner area and exit from the inner area to the outer area, wherein entry to and exit from the inner area takes place via at least one road, and a vehicle lock as claimed in claim 7 is arranged to control vehicles that pass along the road.

9. A traffic control system as claimed in claim 8, wherein a first vehicle lock is arranged to control vehicles that are entering into the inner area on an entrance roads, and a second vehicle lock is arranged to control vehicles that are leaving the inner area on an exit road.

10. A traffic control system as claimed in claim 8, wherein the inner area is a car park or a multi-story garage.

11. A method for identifying a vehicle, comprising.

recording at least a first image of the vehicle using a digital camera, the first image includes at least a registration plate and a light arrangement, identifying a position and orientation of the light arrangement on the vehicle via image analysis of the first image, determining a type of vehicle on a basis of information stored in a database via the position and orientation of light arrangements on different types of vehicles and the identification of the position and orientation of the light arrangement and identifying a position and orientation of the registration plate on the vehicle in relation to the identified position of the light arrangement via the image analysis of the first image in order to thereby achieve a unique identification of the vehicle.

12. A method as claimed in claim 11, wherein the position and orientation identification of the light arrangement provides sufficient identification to distinguish what type of vehicle the light arrangement represents, on the basis of information stored in the database, and the identification of the type of vehicle is used in order to set up a coordinate system for the vehicle so as to precisely determine the position and orientation of the registration plate.

13. A method as claimed in claim 11, wherein the recording of the first image is a back of the vehicle and the light arrangement, the light arrangement is at least one of a reflector, a rear light and a brake light.

14. A method as claimed in claim 11, wherein the vehicle is illuminated during the recording of the images and where the illumination is infrared illumination, or is light in the visible spectrum.

15. A method as claimed in claim 11, wherein other dimensions are identified, the other dimensions being at least one of length, height, color, height above the ground of the rear light arrangements, or any combination thereof.

16. A method as claimed in claim 11, wherein determining the type of vehicle is performed by matching at least one geometric figure which includes a first and a second axis and a center of gravity to the light fields in the first image, calculating a first set of values on a basis of the dimensions of the first and second axes, and the angle in relation to each other for a number of the different light fields, and searching in the database for values that are the same as the first set of values and associating the vehicle with the type of vehicle which is associated in the database with the first set of values.

17. A method as claimed in claim 11, wherein the position, shape and orientation of the registration plate is performed by matching at least one geometric figure which includes a first and a second axis and a center of gravity to the light field in the first image that represents the registration plate.

18. A method as claimed in claim 11, wherein, for each type of vehicle, the database includes at least two different sets of values for position or orientation of the rear light arrangements or registration plate to identify the same type of vehicle.

19. A method as claimed in claim 11, wherein the database comprises other typical dimensions for the type of vehicle, the other typical dimensions being at least one of length, height, shape, or any combination thereof.

20. A method as claimed in claim 11, wherein, for each type of vehicle, the database includes position or orientation of at least one of or a combination of any of the following identification features: rear light, braking light, reflector, defective rear light, defective brake light, defective reflector, dirty rear light, dirty brake light, dirty reflector, snow-covered rear light, snow-covered brake light, and snow-covered reflector.

21. A method as claimed in claim 11, wherein a registration number on the registration plate is identified by image analysis of the image.

22. A method as claimed in claim 11, wherein the position of a tax mark on the registration plate is also identified by image analysis of the image.

23. A method as claimed in claim 11, wherein further recording of images of the vehicle are carried out with simultaneous infrared illumination, and in that the analysis includes these images being subtracted from images recorded without infrared illumination, whereby images are obtained that are independent of the light.

24. An arrangement for vehicle control in a car park by the method as claimed in claim 11, comprising an entrance lock and an exit lock provided with a digital camera for recording images of the vehicle and control arrangements.

* * * * *